(12) United States Patent
Sakamoto et al.

(10) Patent No.: US 7,343,618 B2
(45) Date of Patent: Mar. 11, 2008

(54) VIDEO CONTENT TRANSMITTING SYSTEM AND METHOD

(75) Inventors: Shuichi Sakamoto, Sendai (JP); Koichi Shibata, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 807 days.

(21) Appl. No.: 09/764,377

(22) Filed: Jan. 19, 2001

(65) Prior Publication Data

US 2001/0025378 A1   Sep. 27, 2001

(30) Foreign Application Priority Data

Jan. 31, 2000   (JP)   ............................. 2000-021977

(51) Int. Cl.
*H04N 7/173*   (2006.01)
*G06F 15/173*   (2006.01)

(52) U.S. Cl. ............................. 725/93; 725/95; 725/98; 725/116; 725/118; 709/226

(58) Field of Classification Search ............ 725/86–87, 725/90, 91–96, 98, 146–148; 709/220, 226
See application file for complete search history.

(56) References Cited

U.S. PATENT DOCUMENTS

| | | | | |
|---|---|---|---|---|
| 5,583,995 | A * | 12/1996 | Gardner et al. | 709/219 |
| 5,805,804 | A * | 9/1998 | Laursen et al. | 709/223 |
| 5,930,259 | A * | 7/1999 | Katsube et al. | 370/409 |
| 5,948,069 | A * | 9/1999 | Kitai et al. | 709/240 |
| 6,006,264 | A * | 12/1999 | Colby et al. | 709/226 |
| 6,006,267 | A * | 12/1999 | Nguyen et al. | 709/227 |
| 6,014,694 | A * | 1/2000 | Aharoni et al. | 709/219 |
| 6,119,170 | A * | 9/2000 | Schoffelman et al. | 709/244 |
| 6,154,444 | A * | 11/2000 | Masuo et al. | 370/225 |
| 6,208,952 | B1 * | 3/2001 | Goertzel et al. | 709/230 |
| 6,266,701 | B1 * | 7/2001 | Sridhar et al. | 709/232 |
| 6,356,947 | B1 * | 3/2002 | Lutterschmidt | 709/231 |
| 6,392,664 | B1 * | 5/2002 | White et al. | 715/717 |

(Continued)

FOREIGN PATENT DOCUMENTS

JP   11-289350   10/1999

(Continued)

OTHER PUBLICATIONS

Chapter 12: Splitting Live Representations; http://service.real.com/help/library/guides/g270/htmfiles/spliting.htm, Sep. 14, 2000, pp. 1-13.

*Primary Examiner*—Kieu-Oanh Bui
(74) *Attorney, Agent, or Firm*—Mattingly, Stanger, Malur & Brundidge, P.C.

(57) ABSTRACT

A video content transmitting system is provided in which a video content transmitting server among a plurality of servers is automatically determined as to which server can establish a network bandwidth of each of all routes for video content transmission to a proper address of a video content play terminal by using a network protocol usable by the terminal. Information of a network protocol and a network route bandwidth used between the server and terminal is stored at a protocol information manager and a bandwidth information manager. In response to a video content transmission request from a terminal, bandwidths necessary for the routes to the terminal are established and video contents are transmitted by using the network protocol usable by the terminal.

11 Claims, 8 Drawing Sheets

U.S. PATENT DOCUMENTS

| | | | |
|---|---|---|---|
| 6,400,681 B1 * | 6/2002 | Bertin et al. | 370/218 |
| 6,421,726 B1 * | 7/2002 | Kenner et al. | 709/225 |
| 6,470,378 B1 * | 10/2002 | Tracton et al. | 709/203 |
| 6,542,496 B1 * | 4/2003 | Hirota et al. | 370/351 |
| 6,594,699 B1 * | 7/2003 | Sahai et al. | 709/228 |
| 6,609,153 B1 * | 8/2003 | Salkewicz | 709/223 |
| 6,643,258 B1 * | 11/2003 | Ise et al. | 370/230 |
| 6,658,476 B1 * | 12/2003 | Van | 709/230 |
| 6,714,549 B1 | 3/2004 | Phaltankar | |
| 6,735,631 B1 * | 5/2004 | Oehrke et al. | 709/226 |
| 6,898,800 B2 * | 5/2005 | Son et al. | 725/93 |
| 2001/0018772 A1 | 8/2001 | Shibata et al. | |
| 2002/0049977 A1 | 4/2002 | Miller et al. | |

FOREIGN PATENT DOCUMENTS

| | | |
|---|---|---|
| WO | WO 98/040831 | 9/1998 |

* cited by examiner

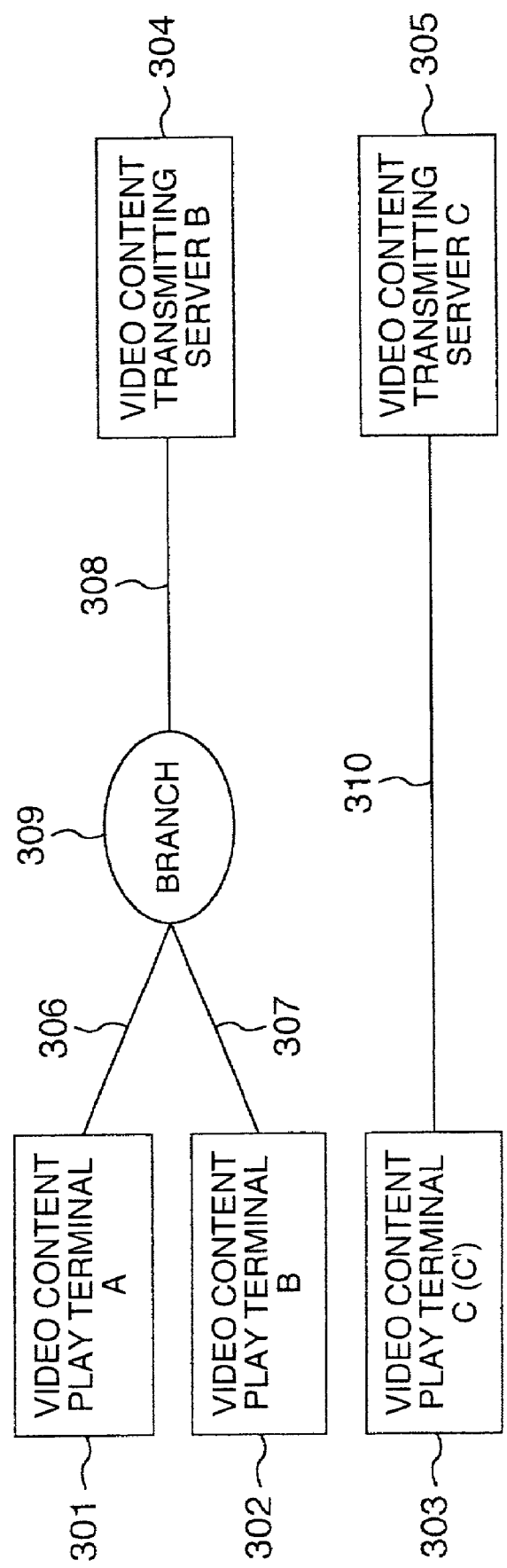

FIG. 4

| VIDEO CONTENT PLAY TERMINAL NAME | VIDEO CONTENT TRANS-MITTING SERVER NAME | USABLE PROTOCOL |
|---|---|---|
| VIDEO CONTENT PLAYER TERMINAL A | VIDEO CONTENT TRANS-MITTING SERVER B | UDP/IP |
| VIDEO CONTENT PLAYER TERMINAL A | VIDEO CONTENT TRANS-MITTING SERVER C | — |
| VIDEO CONTENT PLAYER TERMINAL B | VIDEO CONTENT TRANS-MITTING SERVER B | HTTP |
| VIDEO CONTENT PLAYER TERMINAL B | VIDEO CONTENT TRANS-MITTING SERVER C | — |
| VIDEO CONTENT PLAYER TERMINAL C | VIDEO CONTENT TRANS-MITTING SERVER B | — |
| VIDEO CONTENT PLAYER TERMINAL C | VIDEO CONTENT TRANS-MITTING SERVER C | ATM |

FIG. 5

| NETWORK ROUTE | TOTAL USABLE BANDWIDTH | BANDWIDTH IN USE |
|---|---|---|
| 306 | 10Mbps | 0.5Mbps |
| 307 | 10Mbps | 1.5Mbps |
| 308 | 100Mbps | 2.0Mbps |
| 310 | 256Mbps | 6.0Mbps |

FIG. 6

| VIDEO CONTENT PLAY TERMINAL NAME | VIDEO CONTENT TRANS-MITTING SERVER NAME | VIDEO CONTENT DESTINATION ADDRESS |
|---|---|---|
| VIDEO CONTENT PLAYER TERMINAL A | VIDEO CONTENT TRANS-MITTING SERVER B | VIDEO CONTENT PLAYER TERMINAL A |
| VIDEO CONTENT PLAYER TERMINAL A | VIDEO CONTENT TRANS-MITTING SERVER C | — |
| VIDEO CONTENT PLAYER TERMINAL B | VIDEO CONTENT TRANS-MITTING SERVER B | VIDEO CONTENT PLAYER TERMINAL B |
| VIDEO CONTENT PLAYER TERMINAL B | VIDEO CONTENT TRANS-MITTING SERVER C | — |
| VIDEO CONTENT PLAYER TERMINAL C | VIDEO CONTENT TRANS-MITTING SERVER B | — |
| VIDEO CONTENT PLAYER TERMINAL C | VIDEO CONTENT TRANS-MITTING SERVER C | VIDEO CONTENT PLAYER TERMINAL C' |

VIDEO CONTENT TRANSMITTING SYSTEM AND METHOD

CROSS-REFERENCE TO RELATED APPLICATION

This application relates to U.S. application Ser. No. 09/739,691 filed on Dec. 20, 2000 based on Japanese Application No. 2000-046997, and assigned to the present assignee. The content of that application is incorporated herein by reference.

BACKGROUND OF THE INVENTION

The present invention relates to a video content transmitting system for transmitting video contents requested from a video content play terminal or video viewer terminal. More particularly, the present invention relates to a video content transmitting system having a plurality of video content servers using different video content transmitting network protocols, the video content transmitting system transmitting video contents to a plurality of video content play terminals using different video content receiving network protocols.

With recent high speed and broad bandwidth of the Internet and intranet, it becomes possible to transmit not only text data but also multimedia data such as audio and video data over networks. The International Organization for Standardization are making various standards of specifications to be used for communications over networks.

For example, the Internet Engineering Task Force (IETF) has standardized protocols to be used for communications over networks, such as HTTP (Hyper Text Transfer Protocol (RFC1945)), RTP (Real-time Transfer Protocol (RFC1889)), RSVP (ReSerVation Protocol (RFC2205)) and RTSP (Real Time Streaming Protocol (RFC2326)). Along with these developments, video content transmitting servers have been realized for transmitting video contents requested by video content play terminals to the terminals connected to the Internet, by using various standardized protocols.

For example, there are video on demand products such as RealVideo (Real Networks Corp.) and QuickTime3 (Apple Computer Inc.) both using HTTP and QuickTime4 (Apple Computer Inc.) using RTSP/RTP (Real Time Streaming Protocol/Real-time Transfer Protocol. Other types of video content transmitting servers have also been realized which can transmit high quality images of MPEG-2 to video content play terminals connected to a broader bandwidth network using ATM (Asynchronous Transfer Mode). For the details of such video content transmitting systems, refer to "Guide to Streaming Multimedia" (published by Wiley Computer Publishing Co.).

In a video content transmitting system having a plurality of video content transmitting servers for transmitting video contents by using various protocols, each video content play terminal receives desired video contents by using its network protocol in the following manner. First, the video content play terminal acquires beforehand information of video content transmitting servers capable of transmitting video contents by the protocol desired by the terminal. Then, the terminal directly accesses the desired server among those servers identified by the acquired video content transmitting server information. In this manner, the video content transmitting system can transmit the requested video contents to the terminal.

SUMMARY OF THE INVENTION

The video content transmitting system configured in the above manner is associated with the following problems.

In order for each video content play terminal to acquire beforehand information of video content transmitting servers capable of transmitting video contents by using a protocol desired by the terminal, it is essential that the terminal has its own protocol. Prior to receiving video contents, it is necessary to acquire the information of a protocol possessed by each of all independent video content transmitting servers and directly access the video content transmitting server having the protocol that is the same as that possessed by the terminal. If a new video content transmitting server having a new network protocol is added, the protocol information possessed by each terminal is required to be updated.

Another problem is that since each video content transmitting server independently manages the network bandwidth to be used, it is not possible to manage the network bandwidth of the whole video content transmitting system.

It is an object of the present invention to solve the above-described problems associated with conventional techniques and provide a video content transmitting system and method capable of determining a video content transmitting server without making each video content play terminal and each video content transmitting server consider a usable network protocol.

It is another object of the present invention to provide a video content transmitting system and method capable of automatically determining a video content transmitting server which can establish a network bandwidth necessary for transmitting video contents, from network resources managed by a video content transmitting system, and transmitting video contents to a target video content play terminal.

In order to solve the above problems, according to an aspect of the invention, there is provided a video content transmitting system for transmitting video contents in response to a request by a video content play terminal connected via a network to a video content transmitting server, the video content transmitting system being provided with a function unit for storing information of a protocol usable by each video content play terminal and each video content transmitting server and/or information of a use state of a bandwidth of a network route to the terminal, and a function unit for determining a server capable of transmitting the requested video contents in accordance with the information stored by the information storing function units.

According to another aspect of the invention, a function unit is provided for storing a video content destination address to be used for transmitting video contents to the video content play terminal.

The invention provides a video content transmitting system capable of automatically determining a video content transmitting server capable of video content transmission in accordance with information supplied from these function units and transmitting the video contents to the video content play terminal having requested the video content transmission and having a designated address.

BRIEF DESCRIPTION OF THE DRAWINGS

FIG. 3 is a block diagram showing examples of network routes usable by each video content transmitting server and each video content play terminal of the video content transmitting system shown in FIG. 1, when video contents are to be transmitted.

FIG. 4 is a table illustratively showing information of network protocols stored at a protocol information manager and being usable by each video content transmitting server and each video content play terminal when video contents are to be transmitted.

FIG. 5 is a table illustratively showing a bandwidth use state, such as a total usable bandwidth and a bandwidth in current use, of each network route between each video content transmitting server and each video content play terminal, the bandwidth use state being stored at a bandwidth information manager.

FIG. 6 is a table illustratively showing destination addresses to be used for transmitting video contents from each video content transmitting server to each video content play terminal, the destination addresses being stored at a destination information manager.

DETAILED DESCRIPTION OF THE EMBODIMENTS

The details of embodiments of the invention will be given with reference to the accompanying drawings.

Figure 1:
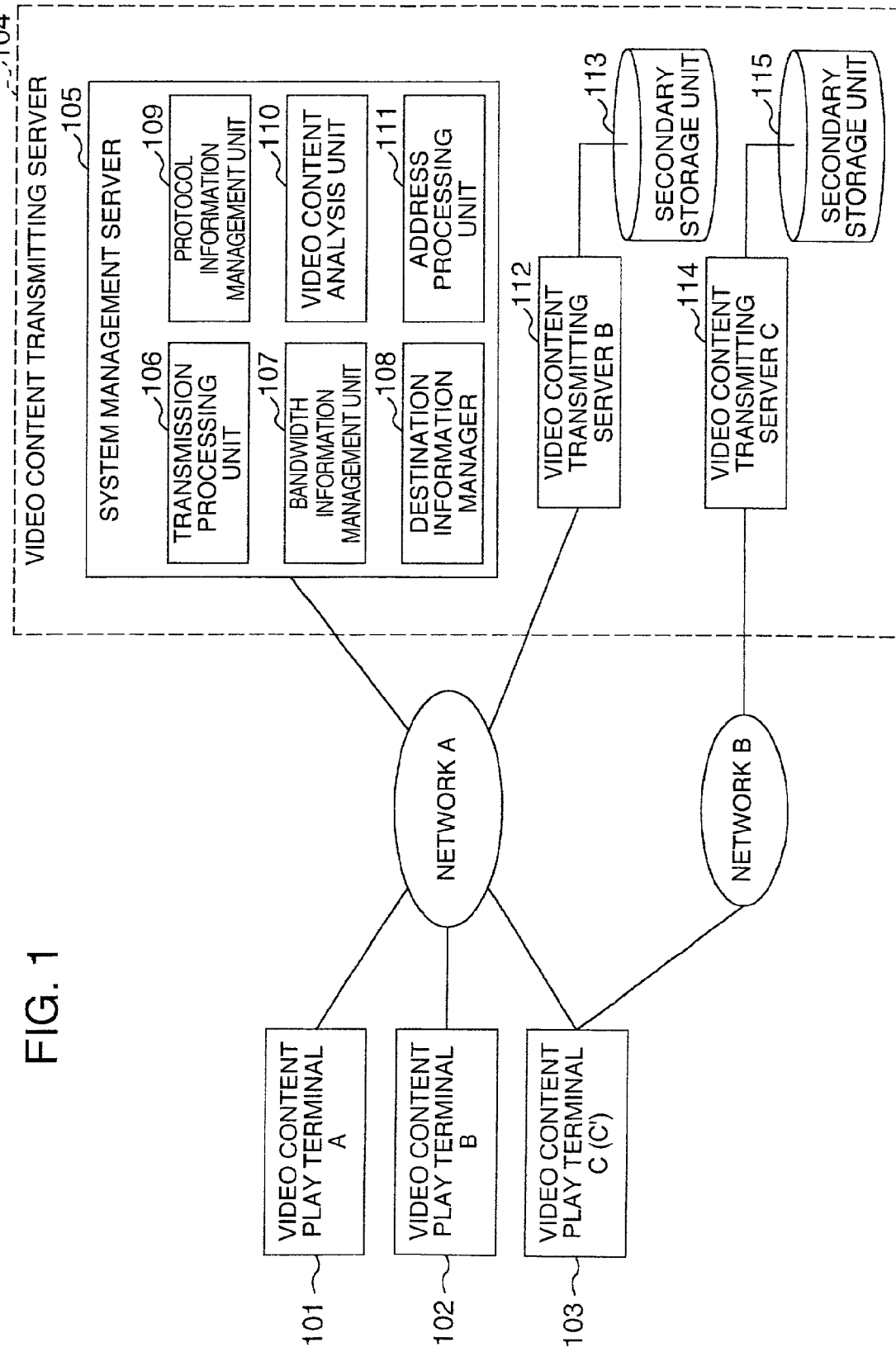
FIG. 1 is a block diagram of a network system constituted of a plurality of video content play terminals and a video content transmitting system having a plurality of video content transmitting servers, according to an embodiment of the invention.

FIG. 1 shows in a block diagram a network system having a plurality of video content play terminals and a video content transmitting system having a plurality of video content transmitting servers in accordance with one embodiment of the invention.

Referring to FIG. 1, reference numerals 101 to 103 represent video content play terminals A to C (C'). Reference numeral 104 represents a video content transmitting system of this embodiment. The video content transmitting system 104 illustratively includes: a system management server 105; a video content transmitting server B 112 connected to a secondary storage unit 113 storing video contents to be transmitted to the video content play terminals A 101 to B 102; and a video content transmitting server C 114 connected to a secondary storage unit 115 storing video contents to be transmitted to the video content play terminal C (C') 103. In response to a request from each of the video content play terminals A 101, B 102, and C (C') 103 connected to networks A and B, each of the video content transmitting servers B 112 and C 114 transmits video contents stored in the secondary storage units 113 and 115.

The system management server 105 has various function units characteristic to the video content transmitting system of this invention. Specifically, the system management server 105 includes: a function unit (hereinafter called a transmission processing unit) 106 for determining a video content transmitting server capable of video content transmission; a function unit (hereinafter called a bandwidth information manager, refer to FIG. 5 for the details) 107 for storing information on a bandwidth use state of each network route between each video content play terminal and each video content server; a function unit (hereinafter called a destination information manager, refer to FIG. 6 for the details) 108 for storing video content destination addresses to be used when video contents are transmitted from each video content server to each video content play terminal; a function unit (hereinafter called a protocol information manager, refer to FIG. 4 for the details) 109 for storing information of network protocols usable between each video content play terminal and each video content server; a function unit (hereinafter called a video content analysis unit) 110 for calculating a network bandwidth to be used for video content transmission; and a function unit (hereinafter called an address processing unit) 111 for determining a destination address to be used for video content transmission.

The video content play terminal C (C') 103 is connected to the video content transmitting system 104 via two different networks. A video content transmission request is made via the network A, and video content transmission is made via the network B. The video content play terminal C (C') 103 has different addresses, i.e., the video content play terminal C for the network A and the video content play terminal C' for the network B, so that the networks A and B can identify the terminal C (C').

In the configuration shown in FIG. 1, the system management server 105 characteristic to the invention for managing the whole of the video content transmitting servers is used. This system management server may not be used, but a video content transmitting server may have therein the transmission processing unit 106, bandwidth information manager 107, destination information manager 108, protocol information manager 109, video content analysis unit 110 and address processing unit 111 shown in FIG. 1.

Figure 2:
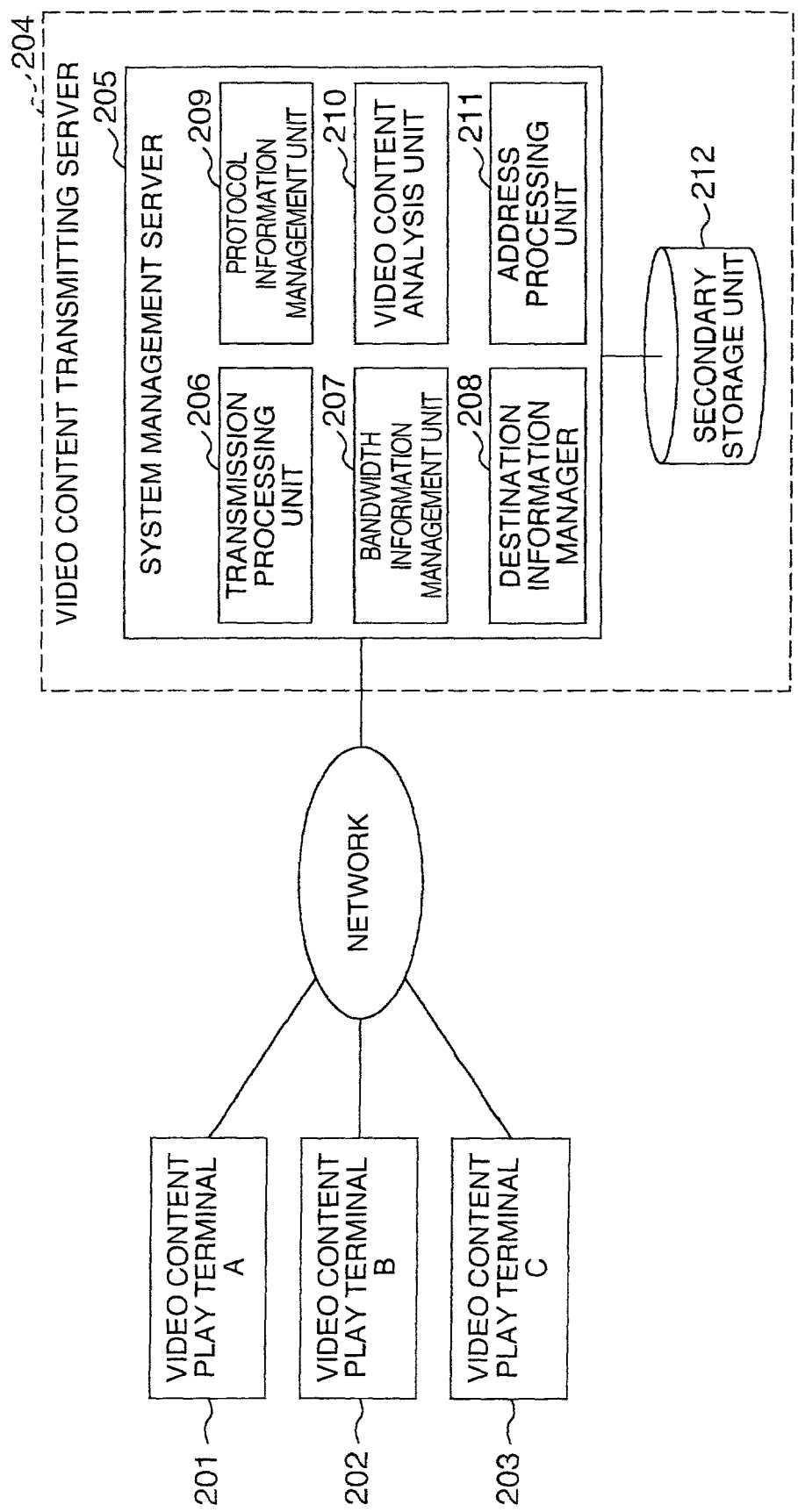
FIG. 2 is a block diagram of a network system constituted of a plurality of video content play terminals and a video content transmitting system having one video content transmitting server, according to a modification of the embodiment.

FIG. 2 shows a modification of the embodiment shown in FIG. 1. In this modification, a dedicated server such as the system management server 105 shown in FIG. 1 is not used. FIG. 2 is a block diagram showing the whole configuration of a video content transmitting system having only one video content transmitting server. This network configuration has a parallel configuration similar to FIG. 1, although not shown in FIG. 2. Similar to the case shown in FIG. 1, in response to a video content transmission request from any of three video content play terminals A 201, B 202, and C 203, a video content transmitting system 204 transmits video contents stored in a secondary storage unit 212 to the requested terminal.

The video content transmitting system 204 of this modification includes one video content transmitting server 205. The video content transmitting server 205 has a transmission processing unit 206, a bandwidth information manager 207, a destination information manager 208, a protocol information manager 209, a video content analysis unit 210 and an address processing unit 211 as well as a secondary storage unit 212, respectively having similar functions to those of the transmission processing unit 106, bandwidth information manager 107, destination information manager 108, protocol information manager 109, video content analysis unit 110 and address processing unit 111 possessed by the system management server 105 shown in FIG. 1.

Next, with reference to FIG. 3, specific examples of the invention will be detailed with reference to the video content transmission system of this invention shown in FIG. 1.

FIG. 3 is a diagram showing examples of network routes usable when video contents are transmitted between each video content transmitting server and each video content play terminal of the video content transmitting system shown in FIG. 1.

As shown in FIG. 3, the video content play terminals A 301 and B 302 are connected to the video content transmitting server B 304 via paths 306 and 307, a branch 309 and a route 308. The video content play terminal C (C') 303 is connected to the video content transmitting server C 305 via a single route 310.

FIG. 4 is a table illustratively showing information of network protocols stored at the protocol information manager 109 and being usable by each video content transmitting server and each video content play terminal, when video contents are to be transmitted.

In FIG. 4, video content play terminal names are stored in a column 401, video content transmitting server names are stored in a column 402, and network protocols usable when video contents are transmitted between each video content transmitting server and each video content play terminal, are stored in a column 403.

As shown in FIG. 4, a protocol "UDP/IP" (transmission capacity of 50 k bits/sec for example) can be used for video content transmission between the video content play terminal A 301 and video content transmitting server B 304. A network protocol "HTTP" can be used for video content transmission between the video content play terminal B 302 and video content transmitting server B 304. A protocol "ATM" can be used for video content transmission between the video content play terminal C 303 and video content transmitting server C 305. Other usable protocols include ADSL (asynchronous digital subscriber line), cable TV networks and CS networks. This transmission capacity is 6 M bits/sec for example. As shown in FIG. 3, since there is no network route usable for video content transmission between the video content play terminal A 301 and video content transmitting server C 305, between the video content play terminal B 302 and video content transmitting server C 305, and between the video content play terminal C 303 and video content transmitting server B 304, no protocol (–) is set to the column 403.

FIG. 5 is a table illustratively showing information of a bandwidth use state, such as a total usable bandwidth and a bandwidth in use, of each network route between each video content transmitting server and each video content play terminal, the bandwidth use state being stored at the bandwidth information manager 105.

In FIG. 5, for each of the network routes 306, 307, 308 and 310 shown in FIG. 3, a network route name is stored in a column 501, a usable total bandwidth is stored in a column 502, and a bandwidth in current use is stored in a column 503.

As illustratively shown in FIG. 5, the network route 306 has a total usable bandwidth of 10 Mbps and a bandwidth in use of 0.5 Mbps. The network route 307 has a total usable bandwidth of 10 Mbps and a bandwidth in use of 1.5 Mbps. The network route 308 has a total usable bandwidth of 100 Mbps and a bandwidth in use of 2.0 Mbps. The network route 310 has a total usable bandwidth of 256 Mbps and a bandwidth in use of 6.0 Mbps.

FIG. 6 is a table illustratively showing information of destination addresses to be used for transmitting video contents from each video content transmitting server to each video content play terminal, the destination addresses being stored at the destination information manager 108.

In FIG. 6, video content play terminal names are stored in a column 601, video content transmitting server names are stored in a column 602, and corresponding video content destination addresses are stored in a column 603. In this case, the name of each video content play terminal is used as the video content destination address.

As shown in FIG. 6, the video content destination address between the video content play terminal A 301 and video content transmitting server B 304 is a "video content play terminal A", and the video content destination address between the video content play terminal B 302 and video content transmitting server B 304 is a "video content play terminal B".

Since the video content play terminal C 303 is connected to the video content transmitting system via two networks as shown in FIG. 1 and different networks are used for the video content transmission request and video content transmission as described earlier, a "video content play terminal C'" is stored in the column 603 representative of the video content destination address between the video content play terminal C 303 and video content transmitting server C 305.

As shown in FIG. 3, since there is no network route usable for video content transmission between the video content play terminal A 301 and video content transmitting server C 305, between the video content play terminal B 302 and video content transmitting server C 305, and between the video content play terminal C 303 and video content transmitting server B 304, no address (–) is set to the column 603 of the video content destination address.

Figure 7:
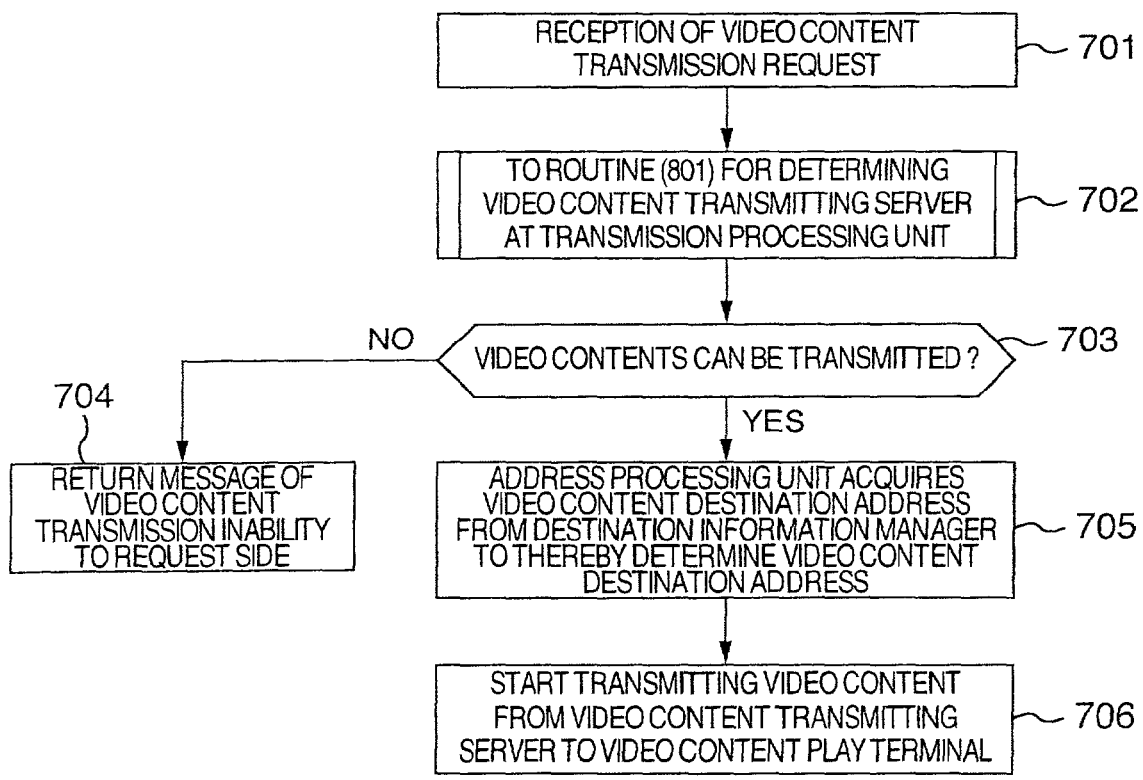
FIG. 7 is a flow chart illustrating an operation to be executed by the video content transmitting system when video contents requested by a video content play terminal are transmitted from the system to the terminal.

FIG. 7 is a flow chart illustrating the operation steps to be executed by the video content transmitting system having the structure described with reference to FIG. 1 and FIGS. 3 to 6 when video contents requested by a video content play terminal are transmitted from the system to the terminal.

Figure 8:
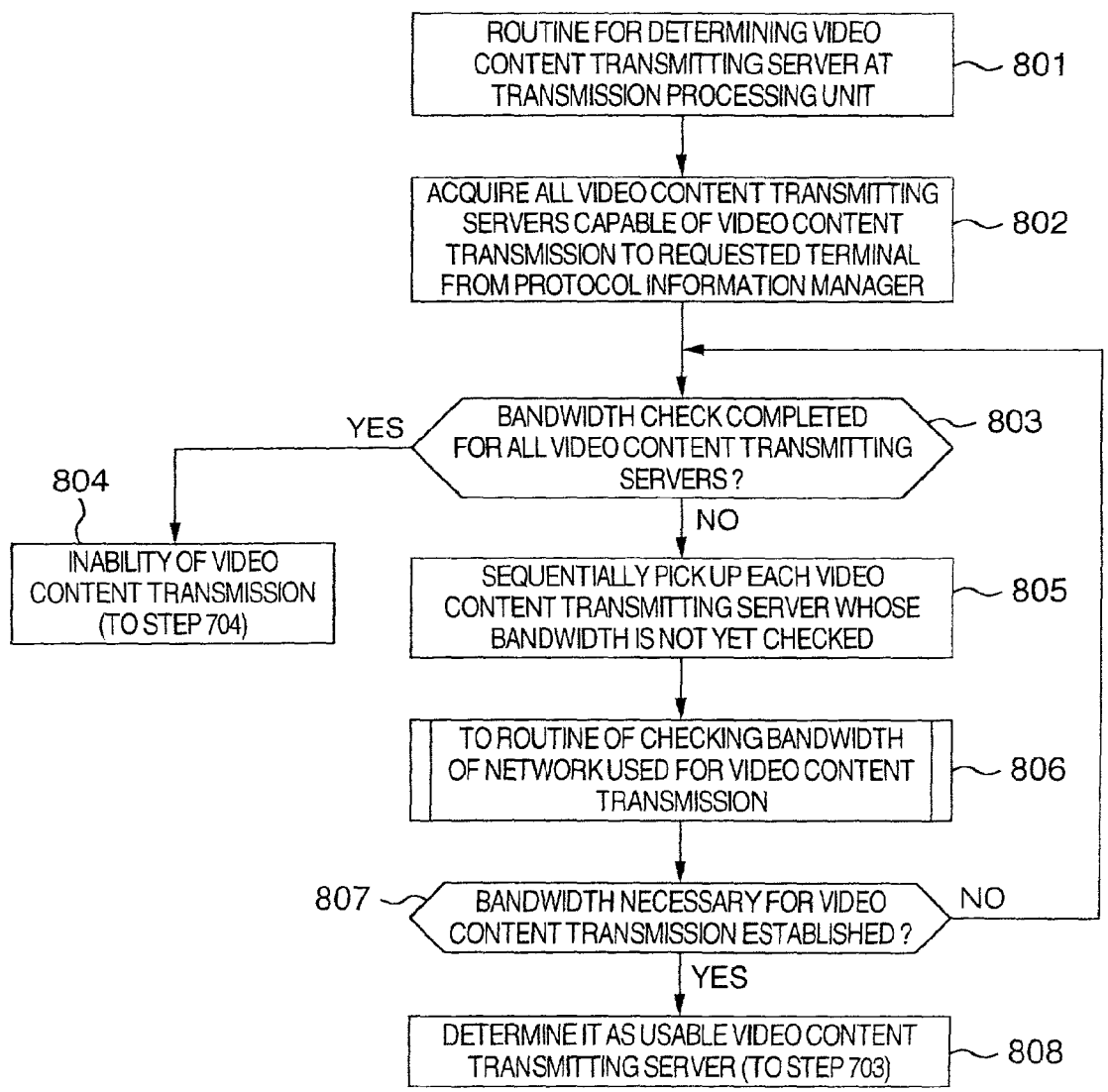
FIG. 8 is a flow chart illustrating the details of a process (at Step 702 shown in FIG. 7) to be executed by a transmission processing unit when a video content transmitting server usable for video contents transmission is determined.

Referring to FIG. 7, upon reception of a video content transmission request from any one of the video content play terminals 101 to 103 (Step 701), the system management server 105 of the video content transmitting system 104 makes the transmission processing unit 106 determine an available video content transmitting server (Step 702, refer to FIG. 8 for the details).

If there is a video content transmitting server capable of video content transmission (YES at Step 703), the address processing unit 111 acquires the video content destination address information shown in FIG. 6 from the destination information manager 108 to thereby determine the video content destination address (Step 705) and transmit the video contents from the determined video content transmitting server toward the video content destination address (Step 706). If there is no video content transmitting server capable of video content transmission (NO at Step 703), the message that the video contents are unable to be transmitted is returned to the requested video content play terminal (Step 704).

FIG. 8 is a flow chart illustrating the details of the process (at Step 702 shown in FIG. 7) to be executed by the transmission processing unit 106 when a video content transmitting server usable for video contents transmission is determined.

Upon reception of a video content transmitting server determining request at the transmission processing unit 106 (Step 801), the transmission processing unit 106 acquires information of the video content transmitting server capable of transmitting video contents to the video content play terminal which issued a transmission request, from the protocol information manager 109 (refer to FIG. 4) (Step 802).

Next, the transmission processing unit 106 checks whether there is a video content transmitting server whose bandwidth is not yet checked among those video content transmitting servers determined at Step 802 (YES at Step 803), sequentially picks up such a video content transmitting server (Step 805) and checks the bandwidth of the network used by the video content transmitting server for video content transmission (Step 806, refer to FIG. 9 for the details) to judge whether the network bandwidth for video content transmission can be established (Step 807). If there is a video content transmitting server capable of establishing the network bandwidth (YES at Step 807), it is determined that the video contents can be transmitted from this video content transmitting server to thereafter advance to Step 703 shown in FIG. 7 (Step 808).

If there is no video content transmitting server capable of establishing the network bandwidth for video content transmission (NO at Step 803), it is judged that the video contents cannot be transmitted, to thereafter advance to Step 704 shown in FIG. 7 (Step 804).

Figure 9:
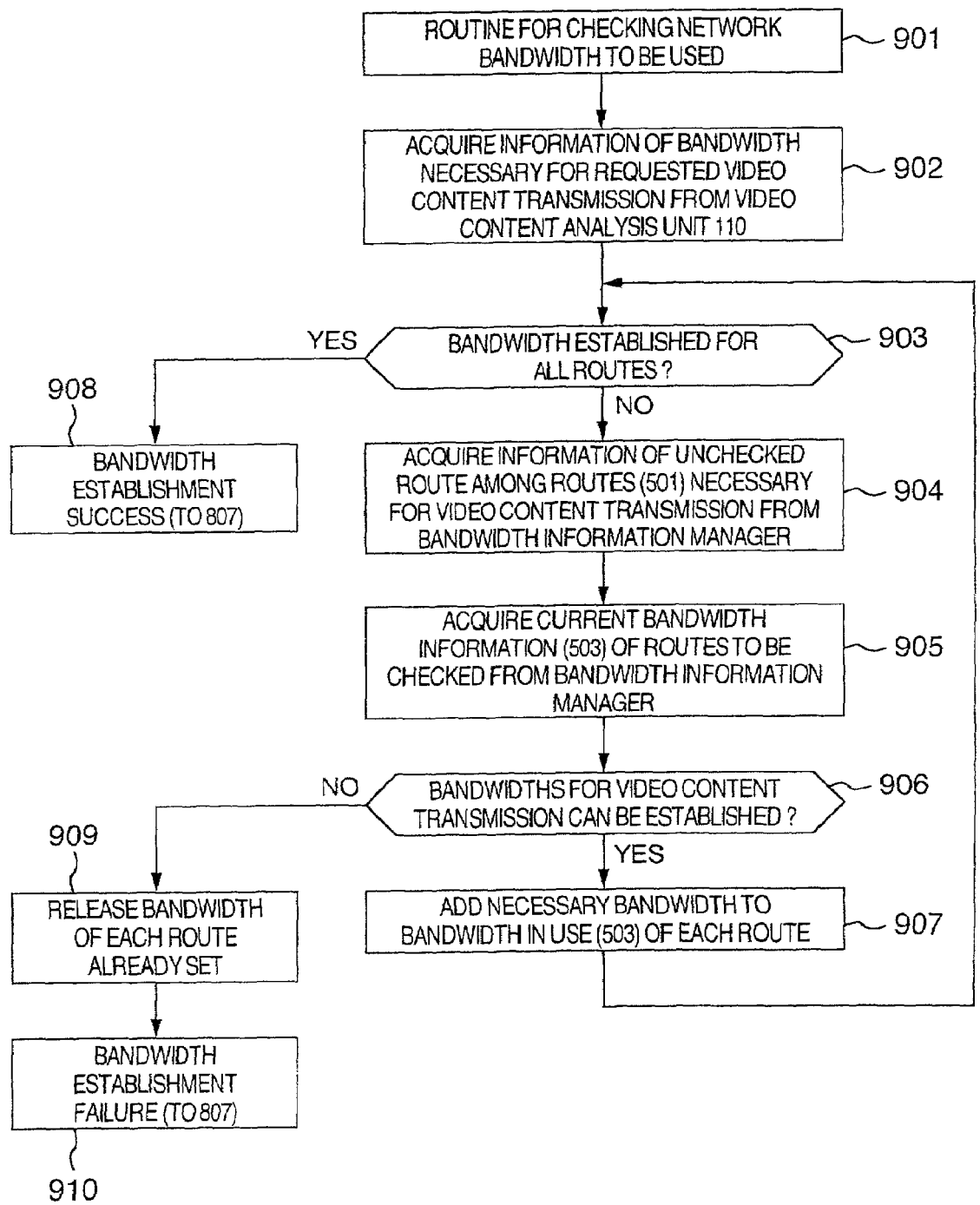
FIG. 9 is a flow chart illustrating the details of a bandwidth check routine (at Step 806 shown in FIG. 8).

FIG. 9 is a flow chart illustrating the details of the bandwidth check routine (at Step 806 shown in FIG. 8).

First, a routine for checking network bandwidth to be used is executed (Step 901). A bandwidth necessary for transmitting requested video contents is acquired from the video content analysis unit 110 (Step 902). Next, the bandwidth information manager 107 (refer to FIG. 5) is checked, and if the bandwidth cannot be established at all routes to be used for transmitting the video contents from the video content transmitting server to the video content play terminal (NO at Step 903), one unchecked route whose bandwidth is not established is acquired from the bandwidth information manager 107 (Step 904) to acquire the current bandwidth use state of the route (Step 905).

If the value of the bandwidth necessary for video content transmission added with the bandwidth in current use (column 503) does not exceed the total usable bandwidth (column 502) (YES at Step 906), the bandwidth in current use (column 503) is updated (Step 907) to thereafter return to Step 903 where it is checked whether the bandwidth can be established at the next route.

This process is performed for all network routes to be used for video content transmission. For example, if video contents are transmitted from the server 304 to terminal 301 shown in FIG. 3, this process is performed for the routes 306 and 308. If the bandwidth can be established for all necessary network routes (YES at Step 903), it is judged that the bandwidths of all network routes necessary for the video content transmitting server are established (Step 908), to thereafter execute Step 807 and following Steps shown in FIG. 8.

If there is even one route unable to establish the bandwidth (NO at Step 906), the bandwidth in current use (column 503) updated until then is changed to the bandwidth before updated (Step 909). It is judged that the bandwidth cannot be established for the video content transmitting server, and the process returns to Step 807 shown in FIG. 8 (Step 910) whereat Step 803 and following steps are again executed for the next video content transmitting server.

Figure 10:
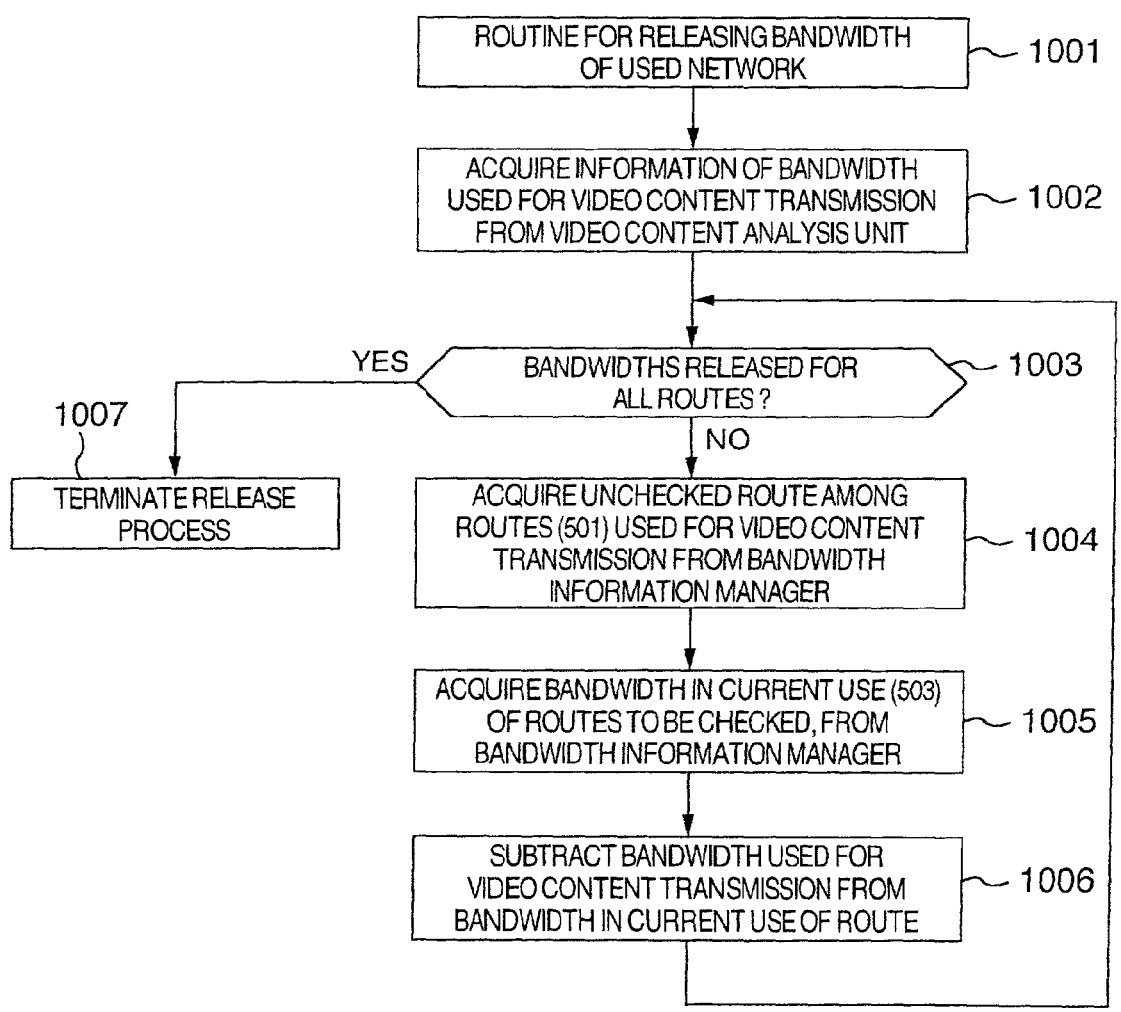
FIG. 10 is a flow chart illustrating the operation of notifying a bandwidth information manager of information of bandwidths used by all network routes between the video content play terminal and video content transmitting server and updating the bandwidth in current use after completion of video content transmission.

FIG. 10 is a flow chart illustrating the operation of notifying the bandwidth information manager 107 of information of bandwidths used by all network routes between the video content play terminal and video content transmitting server and updating the bandwidth in current use (column 503 in FIG. 5) after completion of video content transmission.

First, a routine for releasing bandwidth of used network is executed (Step 1001). Information of the bandwidth of the network used for video content transmission is acquired from the video content analysis unit 110 (Step 1002). Next, the bandwidth information manager 107 (refer to FIG. 5) is checked and if the bandwidths of all network routes used between the video content transmitting server having performed the video content transmission and the video content play terminal having performed the video content reception are not yet released (NO at Step 1003), information of one route still not checked among those network routes between the video content transmitting server having performed the video content transmission and the video content play terminal having performed the video content is acquired from the bandwidth information manager 107 (Step 1004) to acquire the use state of the route (Step 1005).

Next, the bandwidth not in current use after the video content transmission completion is subtracted from the bandwidth in current use (collum 503) (Step 1006) to release the bandwidth to thereafter return to Step 1003 whereat a similar process is repeated for the unchecked route. This process is repeated for all network routes (NO at Step 1003) to thereafter terminate the release process (Step 1007).

The description has been given above by taking as an example the system configuration of the embodiment shown in FIG. 1. The system configuration of the modification shown in FIG. 2 can be used in a similar manner. It is therefore possible to manage network resources of the video content transmitting system, to automatically determine a video content transmitting server capable of establishing a network bandwidth necessary for video content transmission, and to automatically transmit the video contents of the video content transmitting server to the video content play terminal that requested the video content transmission. It should be understood from the above description of the embodiment that each function unit of the system management server can be realized by software (programs) including tables.

As described so far, by adopting the configuration of the embodiment or its modification of this invention, it is possible to automatically determine a video content transmitting server capable of establishing a network bandwidth necessary for all network routes to be used for video content transmission, and to automatically transmit the video contents to the video content play terminal at a predetermined address, in response to a video content transmission request from any one of a plurality of video content player terminals using various network protocols, while the video content play terminal is not required to be conscious of which video content transmitting server can transmit the video contents by using the network protocol the terminal side uses.

What is claimed is:

1. A video content transmitting system having a plurality of video content transmitting servers and being capable of transmitting requested video contents in response to a request from any of video content play terminals connected via a network to said plurality of video content transmitting servers, said video content transmitting system comprising:

means for storing information of a plurality of network protocols capable of video content transmission between the plurality of video content play terminals and the plurality of video content transmitting servers, said means for storing information including a first table of protocols for facilitating communication for each combination of one of the plurality of said video content transmitting servers and one of the plurality of said video content play terminals, wherein the first table includes a listing of the plurality of network protocols, the plurality of video content transmitting servers, and the plurality of video content play terminals, and indicates a correlation between each of the plurality of protocols and a corresponding combination of one of the plurality of said video content transmitting servers and one of the plurality of video content play terminals, and wherein each of the plurality of protocols is specified for a corresponding network route for video content transmission between each of the plurality of video content transmitting servers and each of the plurality of video content play terminals;

means for selecting a video content transmitting server from the plurality of video content transmitting servers based on a protocol determination of the protocols of the first table in respect of the video content play terminal issuing the request to thereby determine the video content transmitting server capable of transmitting said requested video contents to the video content play terminal requesting said video content transmission; and means for managing information of a total available bandwidth of a network route for video content transmission between each video content play terminal and each video content transmitting server, and information of a bandwidth now in use for the video content transmission, said managing means including a second table storing information indicative of a correlation between each network route, the total available bandwidth, and the bandwidth now in use, wherein the second table includes a listing of each network route, the total available bandwidth, and the bandwidth now in use.

2. A video content transmitting system according to claim 1, wherein:

said network includes at least a first network and a second network, in one transmission mode, the first network is used when a video content transmission request is transmitted to the video content transmitting system from the video content play terminal and the second network is used when the video contents are transmitted from the video content transmitting server to the video content play terminal in response to said video content transmission request; and said video content transmitting system further comprises:

means for storing an address for identifying the video content play terminal that issued the video content transmission request via the first network and an address for identifying the video content play terminal receiving the video contents via the second network; and means for determining a video content destination address to which the video contents are transmitted, in accordance with the stored addresses of the video content play terminal on the first and second networks.

3. A video content transmitting system having a plurality of video content transmitting servers and being capable of transmitting requested video contents in response to a request from any of a video content play terminals connected via a network to said plurality of video content transmitting servers, said video content transmitting system comprising:

means for storing information of a plurality of network protocols capable of video content transmission between the plurality of video content play terminals and the plurality of video transmitting servers, said means for storing information including a first table of protocols for facilitating communication for each combination of one of the plurality of video content transmitting servers and one of the plurality of video content play terminals, wherein the first table includes a listing of the plurality of network protocols, the plurality of video content transmitting servers, and the plurality of video content play terminals, and indicates a correlation between each of the plurality of protocols and a corresponding combination of one of the plurality of said video content transmitting servers and one of the plurality of video content play terminals, and wherein each of the plurality of protocols is specified for a corresponding network route for video content transmission between each of the plurality of video content transmitting servers and each of the plurality of video content play terminals; and means for selecting video content transmitting servers from the plurality of video content transmitting servers based on a protocol determination of the protocols of the first table in respect of the request issuing terminal;

means for managing information of a total available bandwidth of a network route for video content transmission between each video content play terminal and each video content transmitting server, and information of a bandwidth now in use for the video content transmission, said managing means including a second table storing information indicative of a correlation between each network route, the total available bandwidth, and the bandwidth now in use, wherein the second table includes a listing of each network route, the total available bandwidth, and the bandwidth now in use;

bandwidth calculating means for calculating a bandwidth of the network route to be used for transmission of requested video contents; and transmission processing means for determining the video content transmitting server capable of transmitting the requested video contents to the requested video content play terminal among the plurality of video content transmitting servers, in accordance with the total available bandwidth, the bandwidth now in use in the second table and the calculated bandwidth necessary for video content transmission determined by said bandwidth calculating means.

4. A video content transmitting system according to claim 3, wherein:

the network includes at least a first network and a second network, in one transmission mode, the first network is used when a video content transmission request is transmitted to the video content transmitting system from the video content play terminal and the second network is used when the video contents are transmitted from the video content transmitting server to the video content play terminal in response to said video content transmission request; and said video content transmitting system further comprises:

means for storing an address for identifying the video content play terminal that issued the video content transmission request via the first network and an address for identifying the video content play terminal receiving the video contents via the second network; and means for determining a video content destination address to which the video contents are transmitted, in accordance with the stored addresses of the video content play terminal on a first terminal on the first and second networks.

5. A video content transmitting system having a plurality of video content transmitting servers and being capable of transmitting requested video contents in response to a request from any of a video content play terminals connected via a network to said plurality of video content transmitting servers, said video content transmitting system comprising:

means for storing information of a plurality of network protocols usable for video content transmission between the plurality of video content play terminals and the plurality of video content transmitting servers, said network protocol information storing means including a first table of protocols for facilitating communication for each combination of one of the plurality of video content transmitting servers and one of the plurality of video content play terminals, wherein the first table includes a listing of the plurality of network protocols, the plurality of video content transmitting servers, and the plurality of video content play terminals, and indicates a correlation between each of the plurality of protocols and a corresponding combination of one of the plurality of said video content transmitting servers and one of the plurality of video content play terminals, and wherein each of the plurality of protocols is specified for a corresponding network route for video content transmission between each of the plurality of video content transmitting servers and each of the plurality of video content play terminals;

means for managing information of a total available bandwidth of a network route for video content transmission between each video content play terminal and each video content transmitting server, and information of a bandwidth now in use for the video content transmission, said managing means including a second table storing information indicative of a correlation between each network route, the total available bandwidth, and the bandwidth now in use, wherein the second table includes a listing of each network route, the total available bandwidth, and the bandwidth now in use; bandwidth calculating means for calculating a bandwidth of the network route to be used for transmission of requested video contents; and transmission processing means for selecting a video content transmitting terminal from the plurality of video content transmitting servers based on a protocol determination of the protocols of the first table in respect of the request issuing terminal to thereby determine the video content transmitting server capable of transmitting the requested video contents to the requested video content play terminal, in accordance with the stored network protocol information and/or in accordance with the total available bandwidth, the bandwidth now in use and the calculated bandwidth necessary for video content transmission.

6. A video content transmitting system according to claim 5, wherein:

the network includes at least a first network and a second network having a transmission bandwidth larger than a transmission bandwidth of the first network, the first network is used when a video content transmission request is transmitted to the video content transmitting system from the video content play terminal and the second network is used when the video contents are transmitted from the video content transmitting server to the video content play terminal in response to the video content transmission request; and said video content transmitting system further comprises:

means for storing an address for identifying the video content play terminal that issued the video content transmission request via the first network and an address for identifying the video content play terminal receiving the video contents via the second network; and means for determining a video content destination address to which the video contents are transmitted, in accordance with the stored addresses of the video contents play terminal on the first and second networks.

7. A video content transmitting system according to claim 5, wherein said first table stores a name of each network protocol capable of video content transmission between each terminal and each video content transmitting server.

8. A video content transmitting method for a video content transmitting system having a plurality of video content transmitting servers and being capable of transmitting requested video contents in response to a request from any of video content play terminals connected via a network to said plurality of video content transmitting servers, said video content transmitting method comprising the steps of:

preparing a first table for storing information of a plurality of network protocols capable of video content transmission between the plurality of video content play terminals and the plurality of video content transmitting servers, said first table of protocols for facilitating communication for each combination of one of the plurality of said video content transmitting servers and one of the plurality of said video content play terminals, wherein the first table includes a listing of the plurality of network protocols, the plurality of video content transmitting servers, and the plurality of video content play terminals, and indicates a correlation between each of the plurality of protocols and a corresponding combination of one of the plurality of said video content transmitting servers and one of the plurality of video content play terminals, and wherein each of the plurality of protocols is specified for a corresponding network route for video content transmission between each of the plurality of video content transmitting servers and each of the plurality of video content play terminals;

selecting a video content transmitting server from the plurality of video content transmitting servers based on a protocol determination of the protocols of the first table in respect of the video content play terminal issuing the request to thereby determine the video content transmitting server capable of transmitting said video contents to a relevant video content play terminal requesting video content transmission, in accordance with said network protocol information stored in said first table, said first table storing a name of each network protocol capable of video content transmission between each terminal and each video content transmitting server; and managing information of a total available bandwidth of a network route for video content transmission between each video content play terminal and each video content transmitting server, and information of a bandwidth now in use for video content transmission, said managing using information stored in a second table indicative of a correlation between each network route, the total available bandwidth, and the bandwidth now in use, wherein the second table includes a listing of each network route, the total available bandwidth, and the bandwidth now in use.

9. A video content transmitting method for a video content transmitting system having a plurality of video content transmitting servers and being capable of transmitting requested video contents in response to a request from any of video content play terminals connected via a network to said plurality of video content transmitting servers, said video content transmitting method comprising the steps of:

storing information of a plurality of network protocols capable of video content transmission between the plurality of video content play terminals and the plurality of video content transmitting servers in a storage device, said storage device including a first table of protocols for facilitating communication for each combination of one of the plurality of video content transmitting servers and one of the plurality of video content play terminals, wherein the first table includes a listing of the plurality of network protocols, the plurality of video content transmitting servers, and the plurality of video content play terminals, and indicates a correlation between each of the plurality of protocols and a corresponding combination of one of the plurality of said video content transmitting servers and one of the plurality of video content play terminals, and wherein each of the plurality of protocols is specified for a corresponding network route for video content transmission between each of the plurality of video content transmitting servers and each of the plurality of video content play terminals;

selecting video content transmitting terminals from the plurality of video content transmitting servers based on a protocol determination of the protocols of the first table in respect of the request issuing terminal;

managing information of a total available bandwidth of a network route for video content transmission between each video content play terminal and each video content transmitting server, and information of a bandwidth now in use for video content transmission, said managing using information stored in a second table indicative of a correlation between each network route, the total available bandwidth, and the bandwidth now in use, wherein the second table includes a listing of each network route, the total available bandwidth, and the bandwidth now in use;

calculating a bandwidth of the network route to be used for transmission of requested video contents; and determining the video content transmitting server capable of transmitting the requested video content play terminal among the plurality of video content transmitting servers, in accordance with the total available bandwidth, the bandwidth now in use in the second table and the calculated bandwidth necessary for video content transmission determined by said bandwidth calculation.

10. A video content transmitting method for a video content transmitting system having a plurality of video content transmitting servers and being capable of transmitting requested video contents in response to a request from any of video content play terminals connected via a network to said plurality of video content transmitting servers, said video content transmitting method comprising the steps of:

preparing a first table for storing information of a plurality of network protocols usable for video content transmission between the plurality of video content play terminals and the plurality of video content transmitting servers, said first table of protocols for facilitating communication for each combination of one of the plurality of video content transmitting server and one of the plurality of video content play terminals, wherein the first table includes a listing of the plurality of network protocols, the plurality of video content transmitting servers, and the plurality of video content play terminals, and indicates a correlation between each of the plurality of protocols and a corresponding combination of one of the plurality video content play terminals, and wherein each of the plurality of protocols is specified for a corresponding network route for video content transmission between each of the plurality of video content transmitting servers and each of the plurality of video content play terminals;

managing information of a total available bandwidth of a network route for video content transmission between each video content play terminal and each video content transmitting server, and information of a bandwidth now in use for video content transmission, said managing using information stored in a second table indicative of a correlation between each network route, the total available bandwidth, and the bandwidth now in use, wherein the second table includes a listing of each network route, the total available bandwidth, and the bandwidth now in use;

calculating a bandwidth of the network route to be used for transmission of a requested video contents; and selecting a video content transmitting terminal from the plurality of video content transmitting servers based on a protocol determination of the protocols of the first table in respect of the request issuing terminal to thereby determine the video content transmitting server capable of transmitting the requested video contents to the requested video content play terminal, in accordance with the stored network protocol information and/or in accordance with the total available bandwidth, the bandwidth now in use and the calculated bandwidth necessary for video content transmission, said first table storing a name of each network protocol capable of video content transmission between each terminal and each video content transmitting server.

11. A video content transmitting method according to claim 10, wherein said first table for storing information of a network protocol usable for video content transmission between the video content play terminal and the video content transmitting terminal can select a network protocol in accordance with the request by the video content play terminal and a network infrastructure.

* * * * *